(12) United States Patent
Yamauchi et al.

(10) Patent No.: US 9,366,526 B2
(45) Date of Patent: Jun. 14, 2016

(54) THREE-DIMENSIONAL POSITION MEASUREMENT SYSTEM

(71) Applicant: NEUBREX CO., LTD., Kobe-shi, Hyogo (JP)

(72) Inventors: Yoshiaki Yamauchi, Kobe (JP); Kenichi Nishiguchi, Kobe (JP); Kinzo Kishida, Kobe (JP)

(73) Assignee: NEUBREX CO., LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/437,615

(22) PCT Filed: Oct. 28, 2013

(86) PCT No.: PCT/JP2013/079117
§ 371 (c)(1),
(2) Date: Apr. 22, 2015

(87) PCT Pub. No.: WO2014/083989
PCT Pub. Date: Jun. 5, 2014

(65) Prior Publication Data
US 2015/0285626 A1    Oct. 8, 2015

(30) Foreign Application Priority Data
Nov. 30, 2012    (JP) .................. 2012-262190

(51) Int. Cl.
*G01B 11/16* (2006.01)
*G01D 5/353* (2006.01)
*G01L 1/24* (2006.01)

(52) U.S. Cl.
CPC ............ *G01B 11/18* (2013.01); *G01D 5/35358* (2013.01); *G01L 1/242* (2013.01)

(58) Field of Classification Search
CPC ..... G01L 1/246; G01L 9/0079; G01L 19/086; G01L 1/24; G01L 1/242; G01L 1/247; G01L 23/16; G01L 5/0038; G01L 11/025; G01L 19/0092; G01L 19/149; G01L 1/00; G01L 1/02; G01L 1/183; G01L 1/243
See application file for complete search history.

(56) References Cited

U.S. PATENT DOCUMENTS 4,927,232 A * 5/1990 Griffiths .................. G01B 11/18
                                                     250/227.24
2006/0001863 A1    1/2006 Kishida et al.
(Continued)

FOREIGN PATENT DOCUMENTS

| JP | 11-344390 A | 12/1999 |
| JP | 2004-101414 A | 4/2004 |
| JP | 2010-185729 A | 8/2010 |
| WO | WO 2004/048889 A1 | 6/2004 |
| WO | WO 2010/061718 A1 | 6/2010 |
| WO | WO 2010/136810 A2 | 12/2010 |

OTHER PUBLICATIONS

International Search Report (PCT/ISA/210) mailed on Dec. 10, 2013, by the Japanese Patent Office as the International Searching Authority for International Application No. PCT/JP2013/079117.
(Continued)

*Primary Examiner* — Michael P Stafira
(74) *Attorney, Agent, or Firm* — Buchanan Ingersoll & Rooney PC

(57) ABSTRACT

A plurality of optical fibers is helically embedded in tubular installation layers on the outer circumferential surface of a shaped body having a circular cross section. A three-dimensional position of the shaped body after deformed produced by bend, torsion, or stretch due to external force is measured by utilizing frequency change or phase change of pulse laser light emitted into the optical fibers caused by Brillouin scattering and/or Rayleigh scattering occurring in the optical fiber deformed in accordance with the shaped body deformation.

12 Claims, 13 Drawing Sheets

(56) References Cited

U.S. PATENT DOCUMENTS

| | | |
|---|---|---|
| 2011/0228255 A1 | 9/2011 | Li et al. |
| 2012/0060615 A1 | 3/2012 | Farhadiroushan et al. |
| 2012/0162639 A1 | 6/2012 | Farhadiroushan et al. |
| 2014/0312215 A1* | 10/2014 | Smith ............... G01K 11/3206 250/253 |
| 2015/0308909 A1* | 10/2015 | Carneal .................. G01L 1/242 250/206 |

OTHER PUBLICATIONS

Awaji, et al., "Monitoring of Extremely Long Pre-Support Steel Pipe Behavior using PPP-BOTDA Optical Fiber Sensing Method", Proceedings of 67th JSCE Symposium, Sep. 2012, VI-022.

Nagano, "Mathematics of Curved Surface—Introduction to Modern Mathematics-", Baifukan Co., Ltd, 1968.

\* cited by examiner

| fiber | installation angle | distance from center | initial circumferential position |
|---|---|---|---|
| a1 | $\varphi_\alpha$ | $r_\alpha$ | $\theta_{\alpha 0}$ |
| a2 | $\varphi_\alpha$ | $r_\alpha$ | $\theta_{\alpha 0} + \pi$ |
| b1 | $\varphi_\beta$ | $r_\beta$ | $\theta_{\beta 0}$ |
| b2 | $\varphi_\beta$ | $r_\beta$ | $\theta_{\beta 0} + \pi$ |

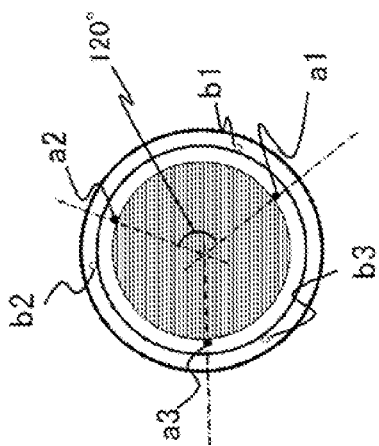

FIG. 9

| fiber | installation angle | distance from center | initial circumferential position |
|---|---|---|---|
| a1 | $\varphi_\alpha$ | $r_\alpha$ | $\theta_{\alpha 0}$ |
| a2 | $\varphi_\alpha$ | $r_\alpha$ | $\theta_{\alpha 0} + 2\pi/3$ |
| a3 | $\varphi_\alpha$ | $r_\alpha$ | $\theta_{\alpha 0} + 4\pi/3$ |
| b1 | $\varphi_\beta$ | $r_\beta$ | $\theta_{\beta 0}$ |
| b2 | $\varphi_\beta$ | $r_\beta$ | $\theta_{\beta 0} + 2\pi/3$ |
| b3 | $\varphi_\beta$ | $r_\beta$ | $\theta_{\beta 0} + 4\pi/3$ |

THREE-DIMENSIONAL POSITION MEASUREMENT SYSTEM

TECHNICAL FIELD

The present invention relates to a three-dimensional position measurement system for measuring a three-dimensional position of a cable or pipe by utilizing the phenomena of Brillouin frequency shift, and/or Rayleigh frequency shift or Rayleigh scattering phase shift in a plurality of optical fibers wound around the cable or pipe.

BACKGROUND ART

In order to prevent collapse and ensure safety during excavation of a tunnel, there has been disclosed a system that includes a plurality of optical fibers straightly installed to an extremely long steel pipe in its longitudinal direction, to monitor movement of the ground during the excavation by measuring strain behavior of the steel pipe by utilizing Brillouin frequency shifts caused by a strain applied to these optical fibers (see Non-Patent Document 1 for example).

There has also been disclosed a distributed optical fiber pressure sensor cable for measuring accurately a pressure value that is constituted with a middle core formed of a flexible tube; pressure measuring optical fibers helically wound around the middle core; axial strain compensating optical fibers embedded in the thickness of the middle core; temperature compensating optical fibers with an extra length, loosely fitted inside the middle core together with a tensile resistance body; and a flexible outermost layer covering the outside of the middle core (see Patent Document 1 for example).

PRIOR ART DOCUMENT

Non-Patent Document

Non-Patent Document 1: D. Awaji, et al., "Monitoring of Extremely Long Pre-Support Steel Pipe Behavior using PPP-BOTDA Optical Fiber Sensing Method", Proceedings of 67th JSCE Symposium, September, 2012, VI-022

Non-Patent Document 2: Nagano, "Mathematics of Curved Surface—Introduction to Modern Mathematics—", Baifukan Co., Ltd, 1968

Patent Document

Patent Document 1: JP 2010-185729 A
Patent Document 2: WO2010/136810 A1

SUMMARY OF THE INVENTION

Problem that the Invention is to Solve

The system of Non-Patent Document 1 for measuring strain behavior of the steel pipe using optical fibers during excavation of a tunnel, since it uses a plurality of optical fibers, can measure a strain caused by a plurality of factors accompanied by axial stretch and bend of the steep pipe, but cannot measure a strain caused by axial torsion of the steel pipe because the optical fibers are installed straight.

In the pressure measurement with the pressure sensor cable of Patent Document 1 using the pressure measurement optical fibers wound helically around the core, a strain detected by the pressure measurement optical fibers contains a strain component caused by temperature change and a strain component in the axial direction. In order to eliminate these components, a plurality of optical fibers are used to obtain accurately the amount of strain due to pressure by subtracting the amounts of strains obtained by the temperature compensating optical fibers and the axial strain compensating optical fibers from the amount of strain detected by the pressure measuring optical fibers. Furthermore, in order to measure correct pressure, the effect of bending is eliminated by shortening the helical pitch, i.e., shortening the width of one complete helix turn less than the spatial resolution of the measuring instrument. However, the effect of torsional deformation is not taken into account.

The present invention is made in light of the above problems and aims at providing a three-dimensional position measurement system that is capable of accurately measuring a three-dimensional position of a deformed connecting body such as a cable connecting a target object to a strain measurement unit, by utilizing Brillouin frequency shifts, and/or Rayleigh frequency shifts or Rayleigh scattering phase shifts occurring in a plurality of optical fibers, which are helically installed in a plurality of tubular installation layers covering the outer surface of the connecting body, deformed by a strain produced in the connecting body by bend, torsion, and/or stretch such as due to external force.

Means for Solving the Problem

A three-dimensional position measurement system according to the present invention comprises a connecting body including:
  an cylindrical inner tube; a tubular optical-fiber installation layer provided so as to cover an outer circumferential surface of the inner tube; and four or more optical fibers installed helically at predetermined pitches in the optical fiber installation layer so as to be deformed in accordance with deformation of the inner tube, and a hybrid backscattering measuring module and analyzer unit including:
  a backscattering measuring module connected with the four or more optical fibers, the module emitting pulse laser light into the fibers and detecting Brillouin scattered light and Rayleigh scattered light in the optical fibers, to measure a frequency change of the Brillouin scattering and/or, a frequency change of Rayleigh scattering or a phase change of Rayleigh scattering for separately detecting strains and a pressure and a temperature from the frequency changes or the phase change; and an analyzer calculating respective strain changes due to bend, stretch, and torsion, and a pressure change and/or a temperature change produced in the inner tube from the frequency change of Brillouin scattering, and/or the frequency change of Rayleigh scattering or the phase change of Rayleigh scattering measured with the scattered light measuring module, and determining a three-dimensional position at a given point of the inner tube by analyzing the calculated respective strain changes and the pressure change and/or the temperature change.

Advantages of the Invention

According to the present invention, a pressure, a temperature and respective strains produced by bend, stretch, and torsion due to effects of the pressure and temperature can be simultaneously measured with accuracy at given three-dimensional positions of a cable or pipe, i.e., a connecting body by utilizing phenomena of Brillouin frequency shifts and/or Rayleigh frequency shifts, or Brillouin frequency shifts and/ or Rayleigh scattering phase shifts occurring in optical fibers installed in the cable or pipe, i.e., the connecting body, thereby bringing about a significant effect of enabling measurement of each three-dimensional position of the connecting body after deformed.

BRIEF DESCRIPTION OF THE DRAWINGS

FIG. 9 is a table showing an installation specification of optical fibers according to Embodiment 2 of the present invention;

EMBODIMENTS FOR CARRYING OUT THE INVENTION

Embodiment 1

Figure 1:
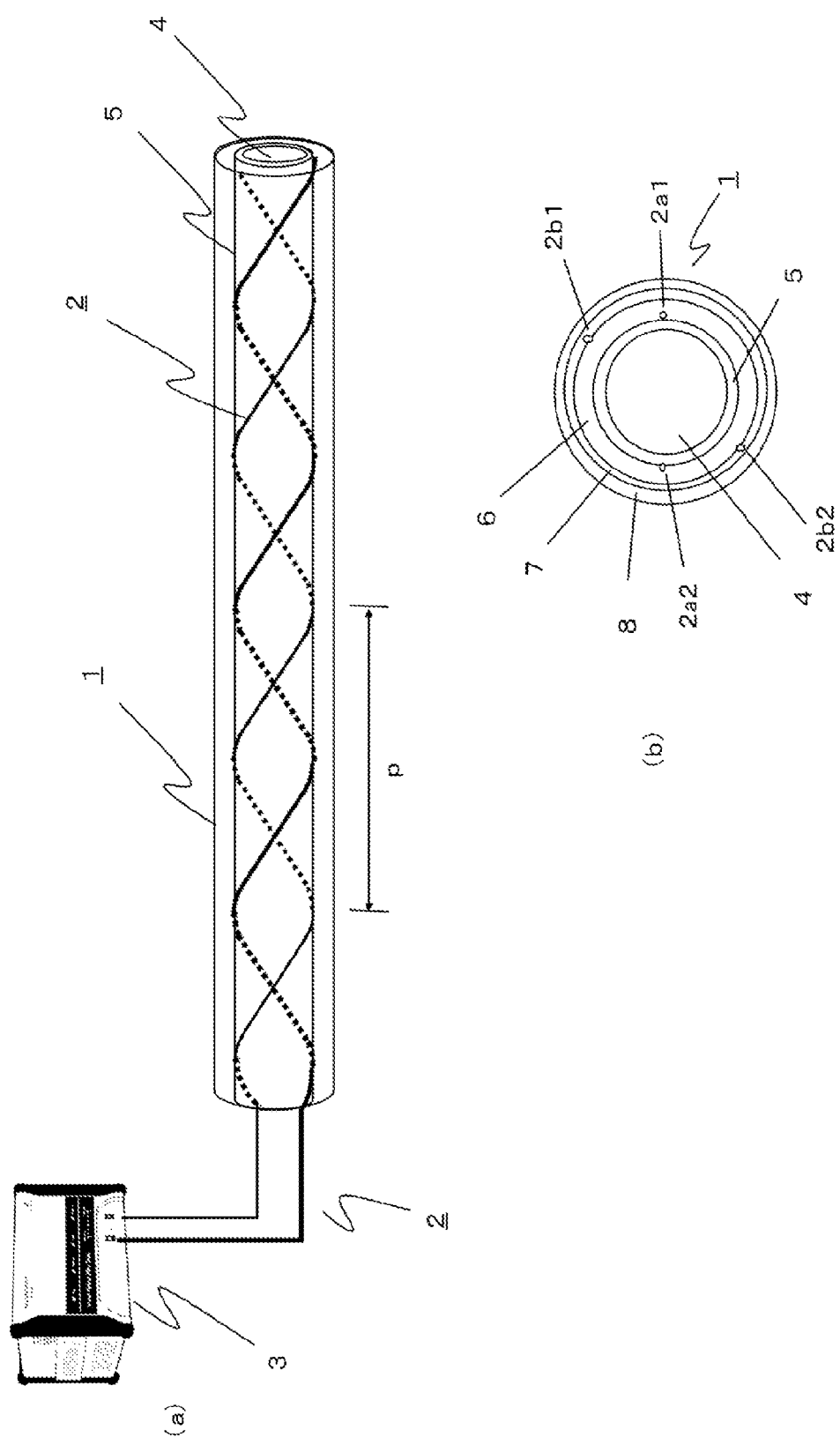
FIG. 1 is an example of a basic configuration of a three-dimensional position measurement system according to Embodiment 1 of the present invention.

FIG. 1 is an exemplary model diagram showing a basic configuration of a three-dimensional position measurement system according to Embodiment 1 of the present invention, for measuring a position of a connecting body deformed when loaded with external force. In FIG. 1, inside the connecting body 1, an annular inner tube 5 is provided outside a cylindrical inner structure 4 positioned at the innermost portion. Total four optical fibers 2 are helically installed in optical fiber installation layers, i.e., two are in a first installation layer 6 on the outer circumferential surface of the inner tube 5 and two are in a second installation layer 7 on the outer circumferential surface of the first installation layer 6. Each end of these four optical fibers are connected to a hybrid backscattering measuring module and analyzer unit 3 that serves as an instrument for measuring strains by utilizing frequency shifts of both Brillouin scattered light and Rayleigh scattered light caused by the strains produced in the optical fibers. The optical fibers need to be wound in such a way that four or more measurement points are included per turn (per helix, i.e., per helical pitch). By deformation due to external force loaded to the connecting body, strains are produced in these four optical fibers 2 embedded in the first optical fiber installation layer 6 outside the inner tube 5 and in the second optical fiber installation layer 7 outside the first installation layer. The hybrid backscattering measuring module and analyzer unit 3 measures and analyzes Brillouin frequency shifts and Rayleigh frequency shifts caused by the strains, to measure a three-dimensional position of an arbitrary point of the connecting body 1 (see FIG. 1(a)). The hybrid backscattering measuring module and analyzer unit 3 includes therein an analyzer for processing measured data. Furthermore, in FIG. 1, an outer protection layer 8 is provided on the outer circumferential surface of the second optical fiber installation layer 7, for protecting the optical fiber installation layers and the optical fibers. Because measured quantities are frequency changes corresponding to strain changes, in performing the above hybrid measurement for a case of determining a three-dimensional position (an absolute three-dimensional position) of the deformed connecting body, it is necessary to preliminarily measure in some way an initial shape (of the cable itself) and a Brillouin scattering spectrum and a Rayleigh scattering spectrum for the initial shape as references for actual measurements.

When light is incident into an optical fiber and its scattered light is frequency-analyzed, there is observed scattered light such as Rayleigh scattered light having a frequency approximately the same as that of the incident light and Brillouin scattered light having a frequency different from that of the incident light by the order of a few to several tens GHz. The frequency difference between the incident light and the scattered light is, for example, a Brillouin frequency. By utilizing the characteristics that the Brillouin frequency varies with stain, temperature, and/or pressure applied to the optical fiber, stain, temperature, and/or pressure applied to the optical fiber can conversely be determined from Brillouin frequency shifts (see, for example, JP2011-053146A for the measurement principle). In particular, measurement utilizing both Brillouin frequency shifts and Rayleigh frequency shifts is referred to as hybrid measurement (the same applies hereinafter). In addition, a phenomenon that the phase of Rayleigh scattered light varies with strain applied to an optical fiber can be used instead of the measurement of Rayleigh frequency shifts (see Patent Document 2 for the measurement principle). In the following, a description is firstly made of a case to which the hybrid measurement is applicable, then a description is made of a case of a solitary measurement using Brillouin frequency shifts only, for a case necessary to take pressure and temperature effects into account; and finally a description is made of measurement for a case unnecessary to take pressure and temperature effects into account.

FIG. 1(b) is an enlarged cross-sectional view of the connecting body. Two sets of two optical fibers split from the four optical fibers 2 are arranged in layers at radial positions different from each other, and the two fibers of each set are arranged at angle positions different from each other by 180 degrees (see FIGS. 1 and 4). The figure shows that the respective sets split from the four optical fibers 2 are separately embedded in the optical fiber installation layers 6 and 7 outside the annular inner tube 5 provided around the circular cross-sectional inner structure 4. That is, the configuration is such that the first-layer optical fibers $2a1$, $2a2$ are installed at the same radial positions point-symmetrical with each other in the first optical fiber installation layer 6 and the second-layer optical fibers 2b1, 2b2 are installed at the same radial positions point-symmetrical with each other in the second optical fiber installation layer 7 outside the first installation layer, and the outside of the second installation layer is covered with the outer protection layer 8 (see FIG. 1 (b)). Note that in the following, "2a1", "2a2" and "2b1", "2b2" are abbreviated as "a1", "a2" and "b1", "b2", respectively, to avoid burdensomeness.

Next, a description is made of the reason why each three-dimensional position of the connecting body after deformed can be measured accurately with the three-dimensional position measurement system thus configured. The connecting body is subject to deformation due to bend, stretch, and torsion, which are mechanically loaded to a cylindrical shaped body, assuming that the connecting body is placed under a constant temperature and pressure, and subject to additional deformation due to temperature and pressure changes when the connecting body is placed under such a changing condition. Accordingly, it is necessary to evaluate effects of all the above parameters on the Brillouin frequency shifts and the Rayleigh frequency shifts. Hence, the evaluation of these effects is explained below in turn. First of all, strains produced by basic loads shown in FIG. 2 are described.

Figure 2:
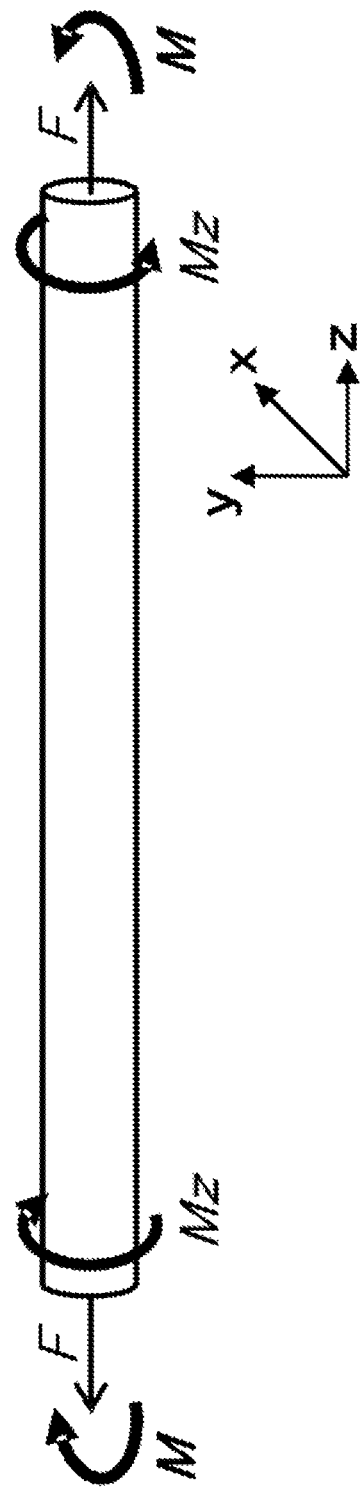
FIG. 2 is a diagram for illustrating basic loads according to Embodiment 1 of the present invention.

A beam (a cylindrical round bar) shown in FIG. 2 is considered as an example of the connecting body. In the figure, a local x, y, z coordinate system is defined so that the axis of the round bar points in the z-direction. Letting F, M ($M_x$, $M_y$; where $M_x$ and $M_y$ are the x-direction and the y-direction components of M, respectively), and $M_z$ be the basic loads of axial force, bending moment, and torsional moment, respectively, strains in the r-, θ-, and z-directions produced in the round bar are expressed as the following Eqs. (1) to (5) in a cylindrical coordinate system (r, θ, z) centered on the axis of the round bar (where r is distance (radius) from the axis and θ is azimuthal angle from a reference direction).

First, strains produced by the axial force F applied to the round bar are expressed by Eq. (1) using stresses $\sigma_r$ (=0), $\sigma_\theta$(=0), and $\sigma_z$(=F/$A_s$):

$$\begin{cases} \varepsilon_r = \frac{1}{E}\{\sigma_r - v\sigma_\theta - v\sigma_z\} = -\frac{v}{EA_s}F \\ \varepsilon_\theta = \frac{1}{E}\{-v\sigma_r + \sigma_\theta - v\sigma_z\} = -\frac{v}{EA_s}F \\ \varepsilon_z = \frac{1}{E}\{-v\sigma_r - v\sigma_\theta + \sigma_z\} = \frac{F}{EA_s} \end{cases} \quad (1)$$

where $A_s$ is a cross-sectional area of the round bar, E is its Young's modulus, and V is its Poisson's ratio.

Next, the bending moment is considered. A curvature k of the cable is expressed by Eq. (2) using a second moment of area I and the bending moment M:

$$k = \frac{M}{EI}. \quad (2)$$

Furthermore, assuming either one of $M_x$ and $M_y$ to be M and a distance from the neutral plane as η, strains produced by the bending moment is expressed by Eq. (3) using stresses $\sigma_r$(=0), $\sigma_\theta$(=0), and $\sigma_z$(=−Mη/I) due to the bending moment:

$$\begin{cases} \varepsilon_r = \frac{1}{E}\{\sigma_r - v\sigma_\theta - v\sigma_z\} = \frac{vM}{EI}\eta \\ \varepsilon_\theta = \frac{1}{E}\{-v\sigma_r + \sigma_\theta - v\sigma_z\} = \frac{vM}{EI}\eta \\ \varepsilon_z = \frac{1}{E}\{-v\sigma_r - v\sigma_\theta + \sigma_z\} = -\frac{M}{EI}\eta. \end{cases} \quad (3)$$

Next, a torsion rate (specific twist angle) Y due to the torsional moment $M_z$ is given by Eq. (4):

$$\gamma = \frac{M_z}{GJ}. \quad (4)$$

And a stain is expressed by Eq. (5) using a stress $\sigma_z$(=$M_z$ r/J):

$$\varepsilon_{\theta_z} = \frac{1}{2G}\sigma_{\theta_z} = \frac{M_z}{2GJ}r, \quad (5)$$

where J is a second polar moment and G is a shearing modulus of elasticity. Furthermore, considering effects of pressure and temperature on stretch, strains caused by pressure and temperature can be evaluated using the following Eqs. (6) and (7) under the condition of no constraint on the axial displacement. Specifically, strains caused by pressure can be expressed by Eq. (6) using stresses $\sigma_r$(=−P), $\sigma_\theta$(=−P), and $\sigma_z$(=−P) (when an external pressure P is applied):

$$\begin{cases} \varepsilon_r = -\frac{P}{E}(1-2v) \\ \varepsilon_\theta = -\frac{P}{E}(1-2v). \\ \varepsilon_z = -\frac{P}{E}(1-2v) \end{cases} \quad (6)$$

And strains caused by a temperature change ΔT can be expressed by Eq. (7):

$$\begin{cases} \varepsilon_r = \alpha\Delta T \\ \varepsilon_\theta = \alpha\Delta T, \\ \varepsilon_z = \alpha\Delta T \end{cases} \quad (7)$$

where α is a coefficient of thermal expansion.

Letting $\Delta\epsilon_F$, $\Delta\epsilon_{Mx}$, $\Delta\epsilon_{My}$, $\Delta\epsilon_{Mz}$ be strain changes of the connecting body for the F, $M_x$, $M_y$, $M_z$, respectively, and ΔP and ΔT be pressure and temperature changes in a placing site of the connecting body, respectively, a relationship shown in the following Eq. (8) holds true between these strain changes and a Brillouin frequency shift $\Delta v_B$:

$$\begin{aligned} \Delta v_B &= C_{13}\Delta P + C_{12}\Delta T + C_{11}(\Delta\varepsilon_F + \Delta\varepsilon_{Mx} + \Delta\varepsilon_{My} + \Delta\varepsilon_{Mz}) \\ &= C'_{13}\Delta P + C'_{12}\Delta T + C_{11}(\Delta\varepsilon_P + \Delta\varepsilon_T + \Delta\varepsilon_F + \Delta\varepsilon_{Mx} + \Delta\varepsilon_{My} + \Delta\varepsilon_{Mz}) \\ &= C_{11}(\Delta\varepsilon_P^+ + \Delta\varepsilon_T^+ + \Delta\varepsilon_F + \Delta\varepsilon_{Mx} + \Delta\varepsilon_{My} + \Delta\varepsilon_{Mz}) \end{aligned} \quad (8)$$

where $C_{ij}$ are sensitivity coefficients specific to each optical fiber; $C'_{ij}$ are sensitivity coefficients that directly correlate ΔP, ΔT with the Brillouin frequency shift; $\Delta\epsilon_P$, $\Delta\epsilon_T$ denote strain changes caused by stretches due to pressure change and temperature change, respectively; and $\Delta\epsilon_{P^+}$, $\Delta\epsilon_{T^+}$ denote apparent strain changes due to pressure change and temperature changes, respectively. Which equation in Eq. (8) should be used to evaluate the Brillouin frequency shift is determined taking into account the installation situation of fibers, the measurement method, and ease of the sensitivity calibration. Note that the sensitivity coefficients $C_{11}$, $C_{12}$, $C_{13}$ need to have values different from each other.

Replacing the sensitivity coefficients $C_{11}$, $C_{12}$, $C_{13}$ in Eq. (8) with respective sensitivity coefficients $C_{21}$, $C_{22}$, and $C_{23}$ correlating these changes with the Rayleigh frequency shifts, a similar equation holds true also for a case with the Rayleigh frequency shifts. That is, letting $\Delta\epsilon_1$, $\Delta\epsilon_2$, $\Delta\epsilon_3$, $\Delta\epsilon_4$ be respective strains of the four optical fibers, the first-layer optical fibers 2a1, 2a2 and the second-layer optical fibers 2b1, 2b2, the following Eq. (9) holds true for a 2×2 system in which two sets of two optical fibers are installed (embedded) in two layers having different optical fiber installation radii with the two optical fibers in each layer being wound around a cable or pipe, or the like in a double helix (two different initial circumferential positions).

$$\begin{cases} \Delta v_B^1 = C_{13}^\alpha \Delta P + C_{12}^\alpha \Delta T + C_{11}^\alpha \Delta \varepsilon_1 \\ \Delta v_R^1 = C_{23}^\alpha \Delta P + C_{22}^\alpha \Delta T + C_{21}^\alpha \Delta \varepsilon_1 \\ \Delta v_B^2 = C_{13}^\alpha \Delta P + C_{12}^\alpha \Delta T + C_{11}^\alpha \Delta \varepsilon_2 \\ \Delta v_R^2 = C_{23}^\alpha \Delta P + C_{22}^\alpha \Delta T + C_{21}^\alpha \Delta \varepsilon_2 \\ \Delta v_B^3 = C_{13}^\beta \Delta P + C_{12}^\beta \Delta T + C_{11}^\beta \Delta \varepsilon_3 \\ \Delta v_R^3 = C_{23}^\beta \Delta P + C_{22}^\beta \Delta T + C_{21}^\beta \Delta \varepsilon_3 \\ \Delta v_B^4 = C_{13}^\beta \Delta P + C_{12}^\beta \Delta T + C_{11}^\beta \Delta \varepsilon_4 \\ \Delta v_R^4 = C_{23}^\beta \Delta P + C_{22}^\beta \Delta T + C_{21}^\beta \Delta \varepsilon_4 \end{cases} \quad (9)$$

In the 2×2 system, because there are eight measurement quantities ($\Delta v_B^1$, $\Delta v_R^1$, ..., $\Delta v_B^4$, $\Delta v_R^4$) for six unknown quantities $\Delta P$, $\Delta T$, $\Delta\epsilon_1$, $\Delta\epsilon_2$, $\Delta\epsilon_3$, $\Delta\epsilon_4$ in Eq. (9), pressure, temperature, and strains can be separated by solving Eq. (9) using a least squares method. The effects of pressure and temperature on stretch can be evaluated using Eqs. (6) and (7) for the condition of no constraint on the axial displacement. The basic loads F, $M_x$, $M_y$, $M_z$ are thereby calculated using equations shown below. Hence, a given three-dimensional position of the connecting body can be determined in accordance with the following procedures. The procedures are described below.

Figure 3:
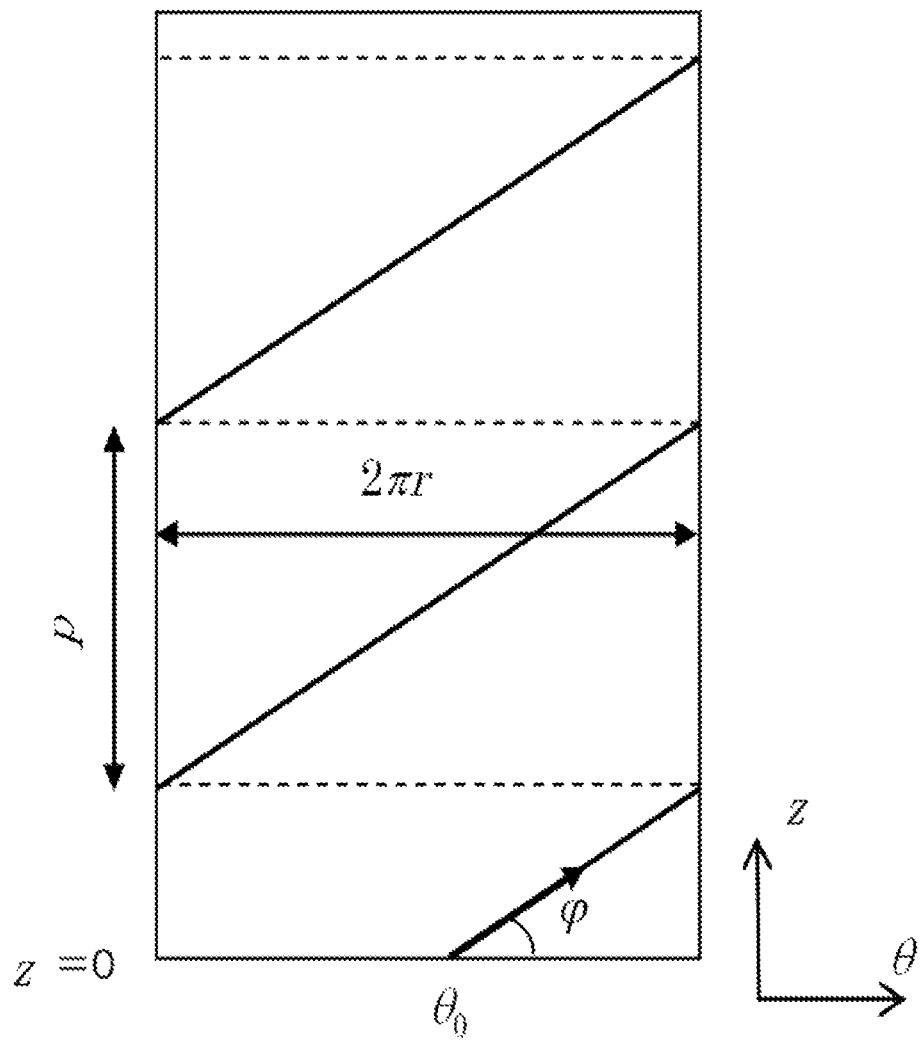
FIG. 3 is a diagram for explaining an installation angle and a helical pitch of an optical fiber according to Embodiment 1 of the present invention.

First, a technique of calculating the basic loads from measured strains is described below. The installation angle $\phi$ of the optical fibers installed helically around the inner tube (its radius is r) of the connecting body is determined as shown in FIG. 3. The helical pitch p and the installation angle $\phi$ (see FIGS. 1 and 3) are defined by Eq. (10):

$$\tan\varphi = \frac{p}{2\pi r}\left(-\frac{\pi}{2} \le \varphi \le \frac{\pi}{2}\right). \quad (10)$$

In Eq. (10), assuming the coordinate of the optical fiber at z=0 to be $\theta_0$ (initial circumferential position), a coordinate $\theta$ of the optical fiber at the position of z=z is expressed by Eq. (11) using the installation angle $\phi$:

$$\theta = \theta_0 + 2\pi\frac{z}{p} = \theta_0 + \frac{z}{r\tan\varphi}. \quad (11)$$

Note that the pitch actually needs to be set, depending on the distance between measurement points, to have a length of four times longer than the distance.

Here, a directional vector v of an optical fiber at an arbitrary position is expressed by Eq. (12) in the cylindrical coordinate:

$$v = \begin{pmatrix} 0 \\ \cos\varphi \\ \sin\varphi \end{pmatrix}. \quad (12)$$

A strain measured at the position with the optical fiber is expressed by the following Eq. (13) using a strain tensor $\epsilon$:

$$\begin{aligned} \epsilon &= v^T \cdot \epsilon \cdot V \\ &= \varepsilon_{\theta\theta}\cos^2\varphi + \varepsilon_{zz}\sin^2\varphi + 2\varepsilon_{\theta z}\sin\varphi\cos\varphi \\ &= \varepsilon_{\theta\theta}\cos^2\varphi + \varepsilon_{zz}\sin^2\varphi + \gamma_{\theta z}\sin\varphi\cos\varphi \end{aligned}. \quad (13)$$

Thus, when the basic loads are applied to the beam (round bar) as shown in FIG. 2, the strain measured with the optical fiber is expressed by the following Eq. (14):

$$\epsilon_f = \frac{1}{EA}(\sin^2\phi - \nu\cos^2\phi)\cdot F + \frac{1}{EI}\cdot r\{\nu\cdot\cos^2\phi - \sin^2\phi\}\cdot\sin\theta\cdot \\ M_x + \frac{1}{EI}\cdot r\{\nu\cdot\cos^2\phi - \sin^2\phi\}\cdot\cos\theta\cdot M_y + \frac{1}{GJ}\cdot r\sin\phi\cos\phi\cdot M_z \quad (14)$$

Since there are four basic loads F, $M_x$, $M_y$, $M_x$ in the equation, strain measurement with four optical fibers allows the four basic loads to be conversely determined from these four measured strain values.

Figure 4:
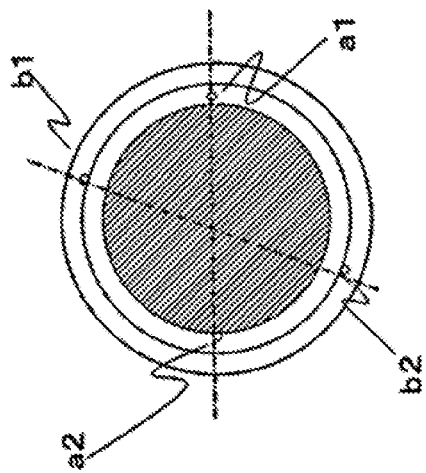
FIG. 4 is a table showing an installation specification of optical fibers according to Embodiment 1 of the present invention.

Next, a typical installation configuration of and corresponding specifications for the four optical fibers are described with reference to FIG. 4. As shown in FIG. 4, the first-layer optical fibers a1, a2 are installed at a distance $r_\alpha$ from the center and at an installation angel $\phi_\alpha$, and the second-layer optical fibers b1, b2, at a distance $r_\beta$ from the center and at an installation angel $\phi_\beta$. Both fibers of each set a1, a2 and b1, b2 are set at initial circumferential positions different from each other by 180 degrees. It should be noted that the initial circumferential positions $\theta_{\alpha 0}$, $\theta_{\beta 0}$ of the fibers a1, b1 need to be set at angles different from each other as shown in the figure. Since the initial positions $\theta_{\alpha 0}$, $\theta_{\beta 0}$ are set at angles different from each other, arbitrary circumferential positions $\theta_\alpha$ and $\theta_\beta$ of the fibers a1, b1 remain at angles different from each other.

Next, a description is made of a procedure of calculating the four basic loads from four strain values measured with the four optical fibers. Relationships of the following Eqs. (15) to (18) hold true between the four strain values and the basic loads A strain value of the optical fiber a1 is expressed by Eq. (15):

$$\epsilon_{f1} = A_\alpha F + B_\alpha \sin\theta_\alpha M_x + B_\alpha \cos\theta_\alpha M_y + C_\alpha M_z \quad (15)$$

Likewise, respective strain values of the optical fibers a2, b1, b2 are expressed by Eqs. (16), (17), and (18):

$$\varepsilon_{f2} = A_\alpha F - B_\alpha \sin\theta_\alpha M_x - B_\alpha \cos\theta_\alpha M_y + C_\alpha M_z, \quad (16)$$

$$\varepsilon_{f3} = A_\beta F + B_\beta \sin\theta_\beta M_x + B_\beta \cos\theta_\beta M_y + C_\beta M_z, \quad (17)$$

and $$\varepsilon_{f4} = A_\beta F - B_\beta \sin\theta_\beta M_x - B_\beta \cos\theta_\beta M_y + C_\beta M_z. \quad (18)$$

In Eqs. (15) to (18), the coefficients $A_\alpha, A_\beta, B_\alpha, B_\beta, C_\alpha, C_\beta$ are expressed by the following Eqs. (19) to (24):

$$A_\alpha = \frac{1}{EA_s}(\sin^2\varphi_\alpha - v\cos^2\varphi_\alpha), \quad (19)$$

$$A_\beta = \frac{1}{EA_s}(\sin^2\varphi_\beta - v\cos^2\varphi_\beta), \quad (20)$$

$$B_\alpha = -\frac{r_\alpha}{EI}(\sin^2\varphi_\alpha - v\cos^2\varphi_\alpha), \quad (21)$$

$$B_\beta = -\frac{r_\beta}{EI}(\sin^2\varphi_\beta - v\cos^2\varphi_\beta), \quad (22)$$

$$C_\alpha = \frac{r_\alpha}{GJ}(\sin\varphi_\alpha \cos\varphi_\alpha), \text{ and} \quad (23)$$

$$C_\beta = \frac{r_\beta}{GJ}(\sin\varphi_\beta \cos\varphi_\beta). \quad (24)$$

By solving Eqs. (15) to (18), the basic loads can be derived as expressed by Eqs. (25) to (28);

$$F = \frac{C_\beta(\varepsilon_{f1} + \varepsilon_{f2}) - C_\alpha(\varepsilon_{f3} + \varepsilon_{f4})}{2(A_\alpha C_\beta - A_\beta C_\alpha)}, \quad (25)$$

$$M_z = \frac{-A_\beta(\varepsilon_{f1} + \varepsilon_{f2}) + A_\alpha(\varepsilon_{f3} + \varepsilon_{f4})}{2(A_\alpha C_\beta - A_\beta C_\alpha)}, \quad (26)$$

$$M_x = \frac{B_\beta\cos\theta_\beta(\varepsilon_{f1} - \varepsilon_{f2}) - B_\alpha\cos\theta_\alpha(\varepsilon_{f3} - \varepsilon_{f4})}{2B_\alpha B_\beta \sin(\theta_\alpha - \theta_\beta)}, \text{ and} \quad (27)$$

$$M_y = \frac{-B_\beta\sin\theta_\beta(\varepsilon_{f1} - \varepsilon_{f2}) + B_\alpha\sin\theta_\alpha(\varepsilon_{f3} - \varepsilon_{f4})}{2B_\alpha B_\beta \sin(\theta_\alpha - \theta_\beta)}. \quad (28)$$

In the above, each equation are derived by assuming the connecting body to be made of an isotropic material for simplicity; however, the connecting body has multi-layer structure in practice, so that it needs to be treated as a complex material each of which layer has a different elastic modulus. Hence, constants, such as E, v, and α, need to be actually measured. In the present invention, the basic loads are calculated from strain of each optical fiber determined with the analyzer from frequency shifts of both Brillouin scattered light and Rayleigh scattered light measured with the hybrid backscattering measuring module. Since the connecting body is assumed in the derivation of the equations to be an isotropic material for simplicity as described above, constants and the like associated with the basic loads need to be calibrated for each cable to be used when the basic loads are calculated.

Next, a description is made below of a method of determining a three-dimensional position at a desired point of the cable or pipe from the basic loads determined above. The three-dimensional position can be estimated in principle by integrating the strains with respect to the basic loads calculated using the above-described relational expressions between the strains and the basic loads (see FIG. 5).

In the following, the method is described sequentially along data processing flow shown in FIG. 5. Because the principle of superposition holds true if deformation of the cable or pipe is small, stretching/compressing and bending of the cable or pipe are treatable separately. As for the stretching/compressing, the cable or pipe is assumed as a straight beam having a length l (ell). Then, it is displaced by $u_z$ by a strain due to the axial force as expressed by Eq. (29):

$$u_z = \int_0^l \varepsilon_z \, dz = \frac{1}{EA_s} \int_0^l F \, dz. \quad (29)$$

Because of different installation paths of the first-layer optical fibers and the second-layer optical fibers, the Eq. (29) can be written as sum of two terms as shown in Eq. (30):

$$u_z = \frac{\sin\varphi_\alpha}{EA_s} \int_0^{l/\sin\varphi_\alpha} f(\varepsilon_{f1}, \varepsilon_{f2}) \, ds_\alpha + \frac{\sin\varphi_\beta}{EA_s} \int_0^{l/\sin\varphi_\beta} g(\varepsilon_{f3}, \varepsilon_{f4}) \, ds_\beta \quad (30)$$

The three-dimensional position of the straight beam is thereby calculated as $l+u_z$. When temperature and pressure changes need to be taken into account, strains caused by these changes may be added to $\varepsilon_z$.

As for bending of the cable or pipe, although it can be calculated by directly integrating the strains expressed by Eq. (3) and (5), there is a method of determining a three-dimensional position by integrating a curvature k and a torsion rate (specific twist angle) Y obtained by measurement with the optical fibers, assuming the cable or the like as a smooth curve (see Non-Patent Document 2). The method is described below by taking a cable as a representative of a cable and the like.

Figure 6:
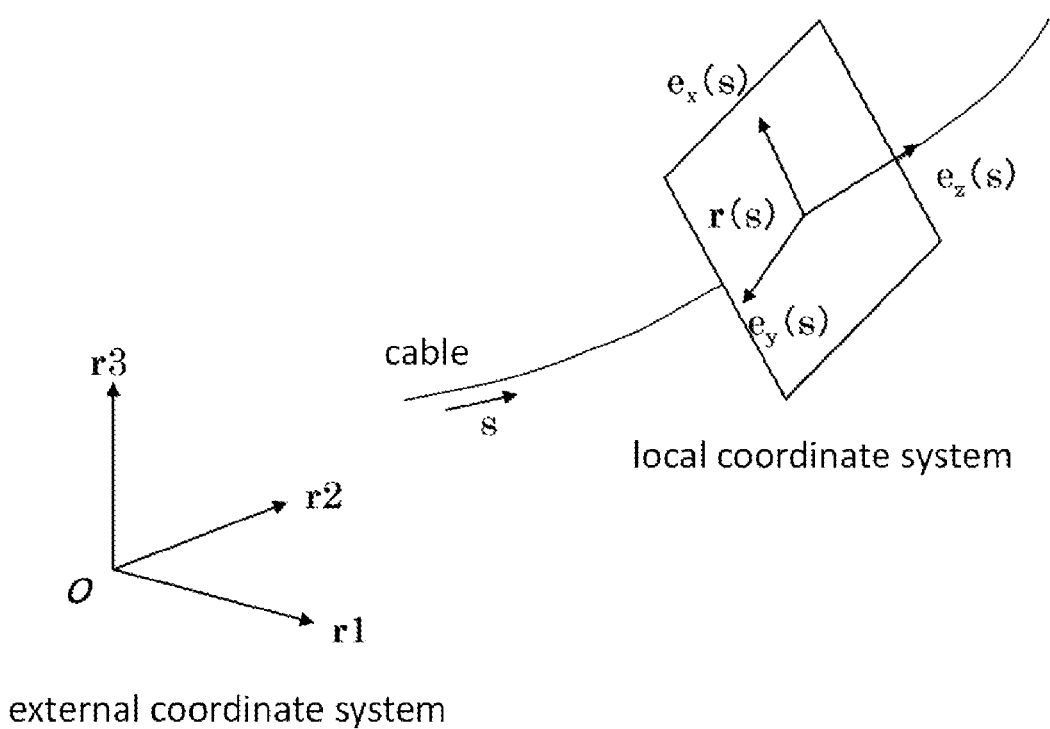
FIG. 6 is diagrams for explaining a coordinate system fixed to the curve of a cable and an external coordinate system, according to Embodiment 1 of the present invention.

Regarding the cable as a smooth curve and designating its arc-length parameter at s, the curve in the three-dimensional space is expressed as r(s); 0≤s≤L. The curve is assumed to have an infinitesimal thickness and its intrinsic direction is assumed to be defined on the plane orthogonal to the curve. The unit vector in this direction is referred to as "x normal", and a local coordinate ($e_z$, $e_x$, $e_y$) fixed to each point of the curve is defined below as shown in FIG. 6. That is, $e_z$ is defined as the unit vector in the direction of the curve, $e_x$, as the x normal vector, and $e_y$, as the unit vector defined so that ($e_z$ $e_x$, $e_y$) constitutes the right-handed system. Among them, $e_z$ is the first derivative of r(s) and is expressed as $e_z$=r'(s), where the prime mark "'" denotes the derivative with respect to s. The curvature vector k(s), while defined as the second derivative of r(s), is the first derivative of $e_z$ according to the above, i.e., k(s)=r''(s)=$e_z$'(s). Since a curvature vector is orthogonal to a directional vector of a curve, the curvature vector can be expressed as k(s)=$k_x$(s) $e_x$+$k_y$(s) $e_y$, where $k_x$(s) and $k_y$(s) are components of the curvature vector in the local coordinate system.

Letting Y(s) be the torsion rate (specific twist angle) of the x normal of the curve along s, the following Eq. (31) holds true:

$$\frac{d}{ds}\begin{pmatrix} e_x(s) \\ e_y(s) \end{pmatrix} = \begin{pmatrix} 0 & \gamma(s) \\ -\gamma(s) & 0 \end{pmatrix}\begin{pmatrix} e_x(s) \\ e_y(s) \end{pmatrix}. \quad (31)$$

Combining the above equations, a differential equation for ($e_z$, $e_x$, $e_y$), i.e., Eq. (32) holds true:

$$\frac{d}{ds}\begin{pmatrix} e_z \\ e_x \\ e_y \end{pmatrix} = \begin{pmatrix} 0 & k_x & k_y \\ -k_x & 0 & \gamma \\ -k_y & -\gamma & 0 \end{pmatrix}\begin{pmatrix} e_z \\ e_x \\ e_y \end{pmatrix} \\ = A\begin{pmatrix} e_z \\ e_x \\ e_y \end{pmatrix} \quad (32)$$

The matrix A in Eq. (32) is expressed as the following Eq. (33):

$$A = \begin{pmatrix} 0 & k_x & k_y \\ -k_x & 0 & \gamma \\ -k_y & -\gamma & 0 \end{pmatrix}. \quad (33)$$

While the arc-length parameter s, which is the argument, is abbreviated in Eqs. (32) and (33), it should be noted that the coordinate system, $k_x$, $k_y$, Y, and A all are functions of s.

Next, a method of estimating using Eq. (32) the position of the cable from measurement values obtained by the optical fibers is described below. In the measurement with the optical fibers, measurement values of the curvatures $k_x$, $k_y$ and the torsion rate Y are assumed to be obtained in the local coordinate system fixed to the cable. Using these values, an equation for the curve with respect to the local coordinate system ($e_z$, $e_x$, $e_y$) is obtained as Eq. (34):

$$\frac{d}{ds}\begin{pmatrix} e_z \\ e_x \\ e_y \end{pmatrix} = A\begin{pmatrix} e_z \\ e_x \\ e_y \end{pmatrix}. \quad (34)$$

where A is the following Eq. (35):

$$A = \begin{pmatrix} 0 & k_x & k_y \\ -k_x & 0 & \gamma \\ -k_y & -\gamma & 0 \end{pmatrix}. \quad (35)$$

While the argument is also abbreviated here, the coordinate system, $k_x$, $k_y$, Y, and A all are functions of s.

In practice, since the local coordinate system ($e_z$, $e_x$, $e_y$) is necessary to be transformed to the external three-dimensional coordinate system, the external coordinate system is expressed as Eq. (36) by regarding its components as three-dimensional column vectors:

$$e_z = \begin{pmatrix} e_{z1} \\ e_{z2} \\ e_{z3} \end{pmatrix}, e_x = \begin{pmatrix} e_{x1} \\ e_{x2} \\ e_{x3} \end{pmatrix}, e_y = \begin{pmatrix} e_{y1} \\ e_{y2} \\ e_{y3} \end{pmatrix}. \quad (36)$$

Then, the differential equation is rewritten as Eq. (37):

$$\frac{d}{ds}(e_z, e_x, e_y) = (e_z, e_x, e_y)A^T. \quad (37)$$

Among solutions obtained by solving Eq. (37), $e_z$ and an estimated value of the position r(s) satisfy the relationship r'(s)=$e_z$ as described above. Hence, the estimated value of the tree-dimensional position can be calculated by integrating this equation (see the following Eq. (38)):

$$r(s) = r(0) + \int_0^s e_z(u)du \quad (38)$$

Figure 5:
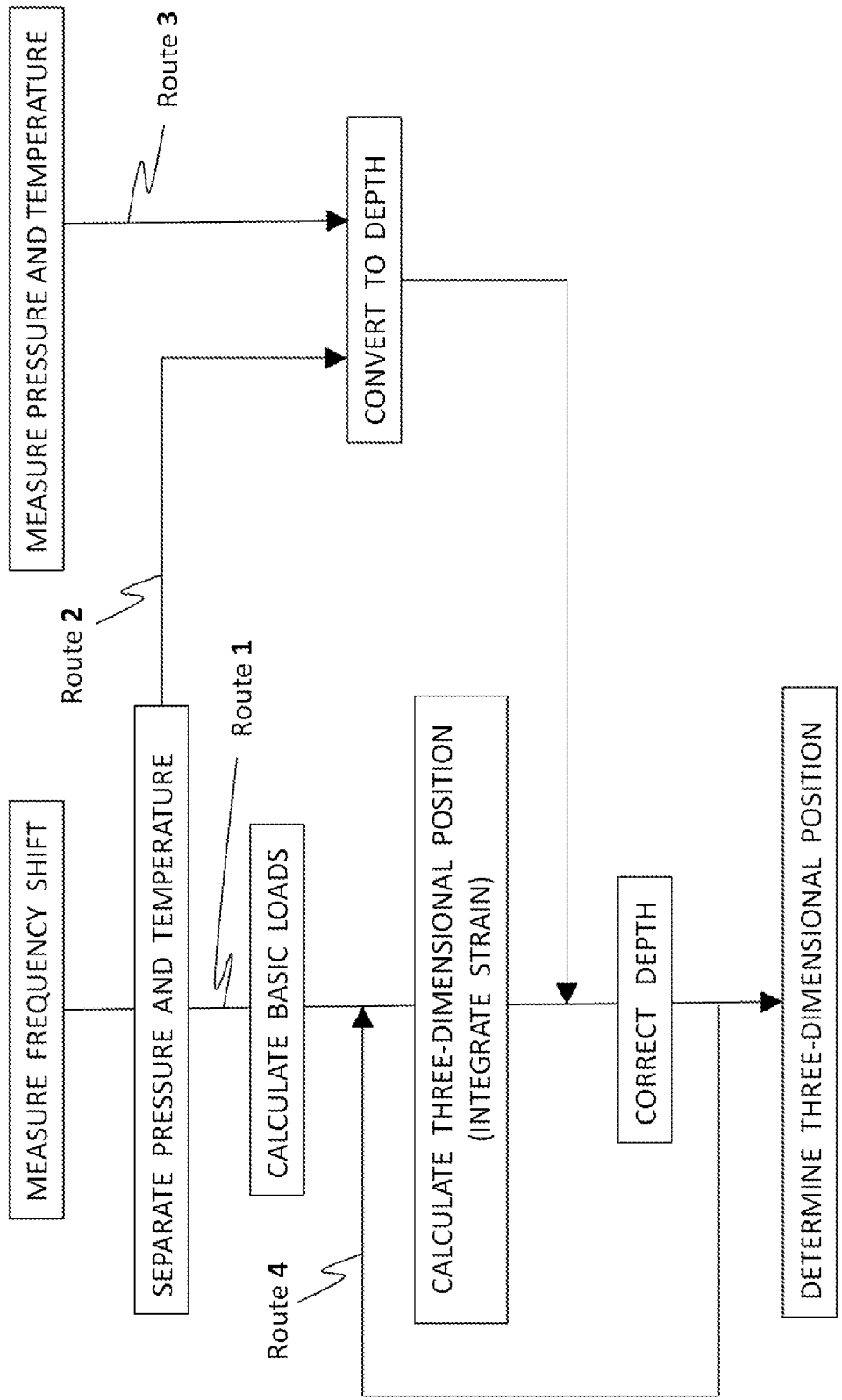
FIG. 5 is a flow diagram for measuring a three-dimensional position using the optical fibers according to Embodiment 1 of the present invention.

The above is a method of calculating a three-dimensional position through the procedures along Route 1 shown in FIG. 5. In the present invention, a three-dimensional position of the cable or the like is calculated by means of the analyzer using Eq. (38). In addition, continuous measurement allows for calculating the trajectory of the cable or the like and of a target object attached to the head thereof. Moreover, dividing a displacement per measurement by a time interval of the measurement allows for calculating the velocity of the cable or the like and of the target object attached to the head thereof. Furthermore, the acceleration can be calculated by differentiating with respect to time the velocity of the cable or the like and of the target object attached to the head thereof.

Since the three-dimensional position that can be calculated from Eq. (38) is an estimated value, it involves an error. The error is the difference between the true position of the cable and the estimated value. Evaluation of the error is described below. As a specific example, a case of accurate estimation of the position of an in-water target object connected to the head of a cable is conceived. Defining as an origin point the above-water position of one end of the cable and as a terminal point the position of the other end of the cable, i.e., the position of the in-water target object, an accurate three-dimensional calculation of the terminal point is described below.

Letting $L_c$ be the length from the origin point to the head of the cable, assuming the cable to be a smooth curve, and employing the arc-length parameter s as with the above, s=0 denotes the origin point and s=$L_c$ denotes the terminal point. Expressing the position of each point on the curve as a three-dimensional vector x(s) and the curvature vector at each point as k(s), the equation of the curve is given as x"(s)=k(s), where the double prime mark "''" denotes second derivative. An elementary arc length is defined at a position s on the curve, and a curvature vector $k_0(s)$ is assumed to be given in the local coordinate system at the position. Since k(s) is rotated from $k_0(s)$ in the three-dimensional space, an orthogonal matrix M(s) exists and is expressed as x"(s)=M(s) k(s). Then, utilizing the fact that a curvature in the local coordinate system can be determined using the four optical fibers wound helically around the surface of the cable, $k_0(s)$ can be expressed using as the following strains ($\epsilon_{f1}$, . . . ) measured with the four optical fibers: $k_0(s)$=A(s) $\epsilon_f(s)$, where $\epsilon_f(s)$=($\epsilon_{f1}(s)$, $\epsilon_{f2}(s)$, $\epsilon_{f3}(s)$, $\epsilon_{f4}(s)$)$^T$, A(s) are coefficient matrices that are expressed using $\theta_\alpha$, $\theta_\beta$ and the like.

According to the above, the estimated value $x_k(s)$ of the position of the cable can be calculated by solving the differential equation: $x_k"(s)$=$M_k(s)$ $k_{0k}(s)$=$M_k(s)$ A(s) $\epsilon_{fk}(s)$, where $M_k$ is an estimated matrix for the orthogonal matrix $M(s)$. The true position of the cable is the solution of $x''(s)=M(s) k_0(s)$ and the position error $\Delta x(s)=x_k(s)-x(s)$ obeys the flowing Eq. (39):

$$\Delta x''(s)=M(s)\Delta k_0(s)+(M_k(s)-M(s))k_0(s). \quad (39)$$

Then, the error is evaluated on the basis of the Eq. (38): For ease of the evaluation, a case where the cable is hung down perpendicularly in the water is discussed here to estimate an error at the head of the cable. In this case, the orthogonal matrix is assumed to be the unit matrix: $M(s) \equiv I_3$. Further assuming the estimated matrix to be equal to the orthogonal matrix: $M_k(s) \equiv I_3$, the error $\Delta x(s)$ of the cable position is expressed as a differential equation: $x''(s)=A(s)\epsilon_f(s)$. It is also assumed that $\phi_\alpha=\phi_\beta$, $r_\alpha=r_\beta$, and $\theta_\beta=\theta_\alpha+(\pi/2)$ in $A(s)$. In this case, the coefficient matrix $A(s)$ is expressed as Eq. (40):

$$A(s) = \frac{1}{2r_a a_a}\begin{pmatrix} \cos\theta_\alpha(s) & -\cos\theta_\alpha(s) & -\sin\theta_\alpha(s) & \sin\theta_\alpha(s) \\ -\sin\theta_\alpha(s) & \sin\theta_\alpha(s) & -\cos\theta_\alpha(s) & \cos\theta_\alpha(s) \\ 0 & 0 & 0 & 0 \end{pmatrix}. \quad (40)$$

And a correlation coefficient $P_{k0}(s)$ of the error $\Delta k_0(s)$ of the curvature vector in the local coordinate system is expressed as the Eq. (41):

$$R_{k0}(s) = \frac{\sigma_{\epsilon_f}^2}{2r_a^2 a_a^2}\begin{pmatrix} 1 & 0 & 0 \\ 0 & 1 & 0 \\ 0 & 0 & 0 \end{pmatrix}. \quad (41)$$

Therefore, an estimated error at the head of the cable is expressed by Eq. (42):

$$\Delta x(L_c)=\int_0^{L_c}\int_0^s \Delta k_0(u)du\,ds. \quad (42)$$

Calculation of the covariance matrix derives Eq. (43):

$$\begin{aligned}R_x(L_c) &\equiv E[\Delta x(L_c)\Delta x^T(L_c)] \quad (43)\\ &= \int_0^{L_c}\int_0^{L_c}\int_0^{s_1}\int_0^{s_2} E[\Delta k_0(u_2)\Delta k_0^T(u_2)]du_1 du_2 ds_1 ds_2 \\ &= \int_0^{L_c}\int_0^{L_c}\int_0^{s_1}\int_0^{s_2} R_{k_0}\Delta s \cdot \delta(u_1-u_2)du_1 du_2 ds_1 ds_2 \\ &= R_{k_0}\Delta s \int_0^{L_c}\int_0^{L_c}\min(s_1,s_2)ds_1 ds_2 \\ &= \frac{1}{3}L_c^3 R_{k_0}\Delta s \\ &= \frac{\sigma_{\epsilon_f}^2 L_c^3 \Delta s}{6 r_a^2 a_a^2}\begin{pmatrix} 1 & 0 & 0 \\ 0 & 1 & 0 \\ 0 & 0 & 0 \end{pmatrix}.\end{aligned}$$

The equation (43) shows that the error in the z-direction (perpendicular direction) is zero and the standard deviation of error in distance on the xy-plane is expressed as Eq. (44):

$$\sigma_{xy} = \sqrt{\frac{L_c^3 \Delta s}{6}}\frac{\sigma_{\epsilon_f}}{r_a a_a}. \quad (44)$$

Assuming, for example, $\phi_\alpha=\phi_\beta=\pi/4$, $v=0.5$, $r_\alpha=r_\beta(a_\alpha?)=2.5$ cm, $\Delta s=1$ cm, $L_c=1$ km, and $\sigma_{\epsilon_f}=0.1\mu\epsilon$, the distance error $\sigma_{xy}$ on the horizontal plane is calculated to be 65.3 mm.

In an actual measurement situation such that, for example, the cable exists in water, if the depth at each point of the cable is obtained using pressure sensors, higher accuracy is expected by replacing estimated position values with the depth values obtained by the pressure sensor. To be more specific, from the relationship between pressure or temperature change measured with the optical fibers installed to the cable and frequency shifts measured by the hybrid measurement, a continuous distribution of pressure or temperature is calculated, and depth correction may be performed by converting the distribution into depth. The conversion is performed by utilizing the fact that the depth $z(s)$ can be calculated using the relationship $P(s)=\rho g z(s)$ between pressure $P(s)$ and depth $z(s)$ (s is the arc-length parameter of the cable), where $\rho$ is the density of water and g is the gravitational acceleration (see Route 2 in FIG. 5).

Then, the three-dimensional position of the cable calculated using the three-dimensional calculation method through the procedures along Route 1 shown in FIG. 5 is subjected to the depth correction as may be necessary using the depth determined through the procedures along Route 2 or Route 3. The three-dimensional position at a given terminal position of the cable can finally be determined accurately by repeating the calculation through the procedures along Route 4 from the origin point position of the cable to the given terminal position (for example, the position of a towed object connected to the head of the cable).

When an independent pressure gage is additionally mounted at some midpoint on the path to the measurement point of the cable or mounted to the towed object connected with the cable, depth can also be calibrated by converting a pressure value measured with such a pressure gage into a depth value (see Route 3 in FIG. 5). When correlation between depth and temperature is preliminarily established instead of the pressure gage, it is also possible to use temperature data as calibration data for depth. In a case of a long cable having a particular point, i.e., a junction point of optical fibers in a middle of the cable, if accurate data such as on the position, the pressure, and the temperature at the junction point is available, a depth value calculated by implementing the present invention can be calibrated using the data. In the present invention, the integration technique is used for the position estimation; hence, more calibration points allows for enhancing the measurement accuracy when the three-dimensional position at a desired point of the cable is measured.

Figure 7:
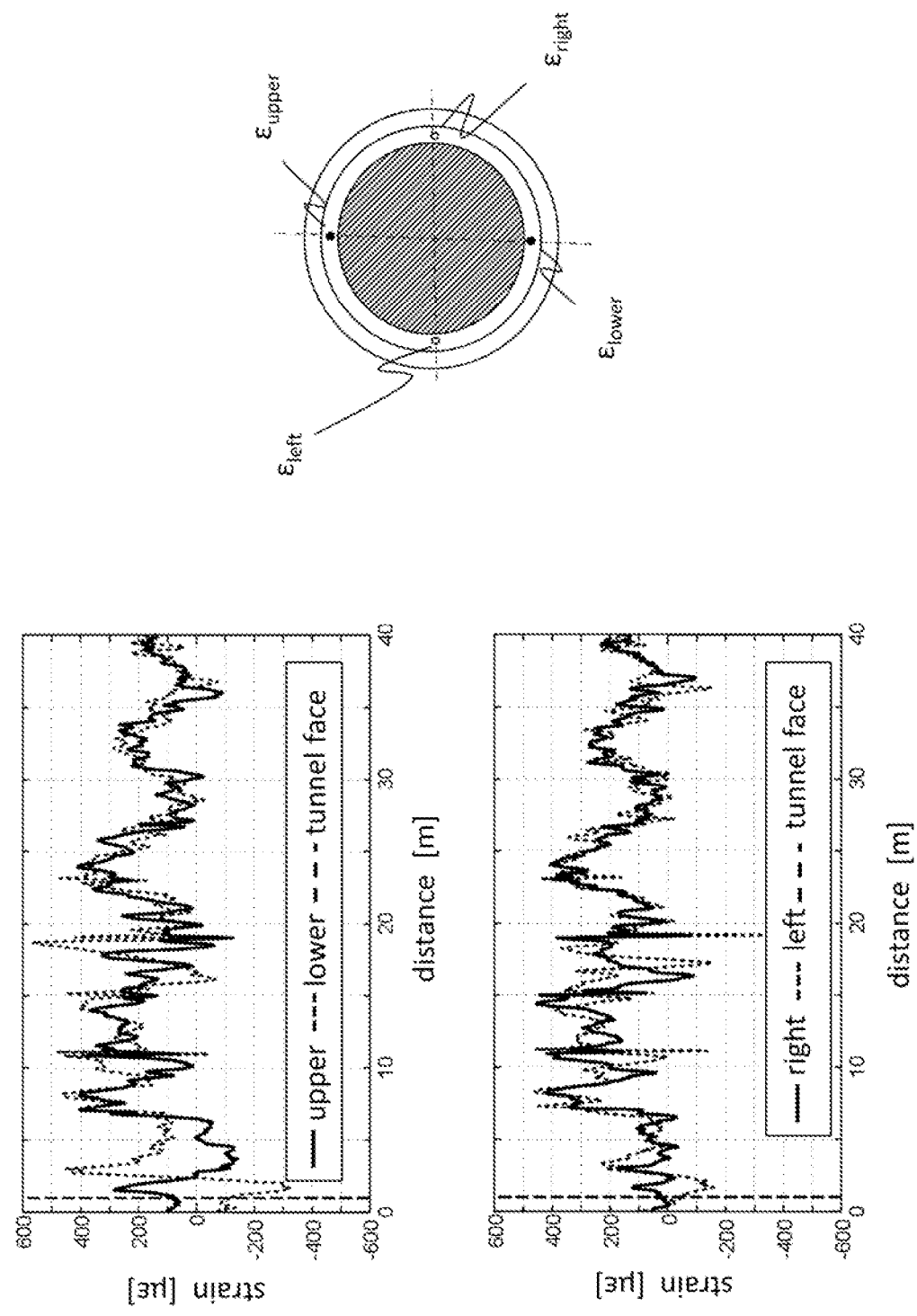
FIG. 7 is graphs showing an measurement example of strains of four optical fibers according to Embodiment 1 of the present invention.

As described above, the present invention shows that a three-dimensional position of the cable can be accurately determined by the hybrid measurement method using four optical fibers. An example of accurate strain measurement performed even in an actual field test using the present measurement method is described here. FIG. 7 is an example of actually measured data on strains of an annular pipe measured by installing four optical fibers in the outer circumferential surface of the pipe in a case of a tunnel excavation. In this measurement, the first-layer optical fibers and the second-layer optical fibers are installed such that their initial circumferential positions are set apart by an angle of 90 degrees with respect to each other (note that the fibers are linearly installed at the same radial position of about 45 mm in the outer circumferential pipe surface and parallel to the pipe axis). The upper graph shows strain data of optical fibers designated at $\epsilon_{upper}$ and $\epsilon_{lower}$ among the four optical fibers (the solid and the dotted lines in the graph show $\epsilon_{upper}$ and $\epsilon_{lower}$ data, respectively), and the lower graph shows strain data of optical fiber sensors designated at $\epsilon_{left}$ and $\epsilon_{right}$ (the solid and dotted lines in the graph show $\epsilon_{right}$ and $\epsilon_{left}$ data, respectively). It is found from the graphs that strain can be measured continuously along the distance taken as the horizontal axis. The difference between the upper and the lower strains corresponds to the bending moment $M_x$ and that between the right and the left strains corresponds to the bending moment $M_y$. The average value of the total four strains of upper and lower, right and left corresponds to axial force. It is found that while distinctive bending deformation occurs vertically and horizontally close to the tunnel face (indicated by the straight broken line) at the distance of 0 m on the abscissa, there are small differences between outputs of the four sensors in locations ranging over 25 m, which shows small bending deformation occurring there (see FIG. 7).

Figure 8:
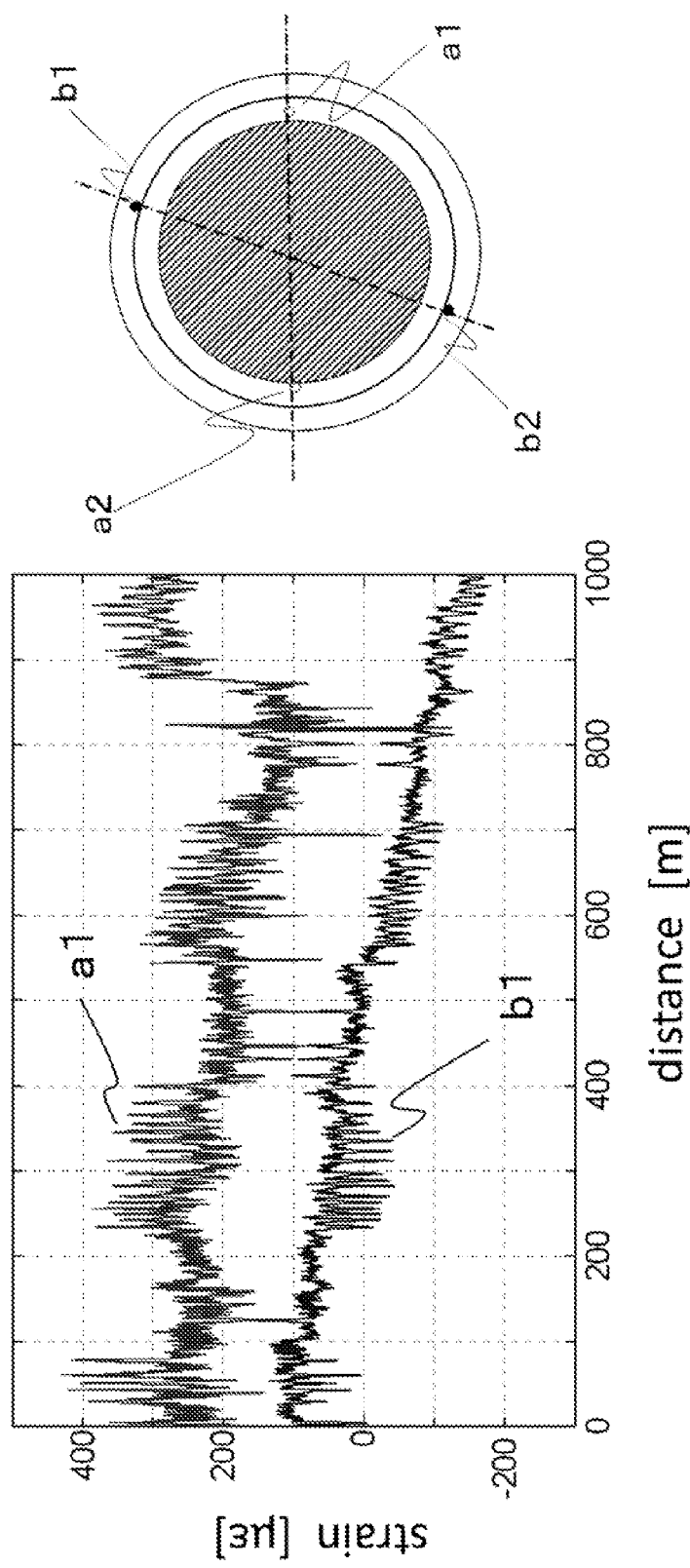
FIG. 8 is a graph showing an example of a measurement result of strains produced by torsion of the optical fibers according to Embodiment 1 of the present invention.

FIG. 8 shows output signals of optical fibers a and optical fibers b wound helically around a cylindrical core, in which strains due to axial torsion are plotted up to a maximum of 1000 m depth. This shows that strain can be measured continuously along the depth taken as the abscissa, as with the above. Along the depth from 250 m to 350 m and from 550 m to 700 m, both signals of the optical fibers a and the optical fibers b swing oppositely to each other in the positive and negative directions. This is due to the fact that the winding directions of the helices of the optical fibers a and the optical fibers b are opposite to each other. The figure shows that the output characteristics of strain caused by torsion can be measured satisfactorily (see FIG. 8).

As has been described above, Embodiment 1 shows that in the 2×2 system in which four optical fibers, i.e., two sets of two optical fibers are installed (embedded) in two layers having different radii with the two optical fibers in each layer being wound around a cable or pipe, or the like in a double helix (two different initial circumferential positions), the three-dimensional position at a given point of the cable can be determined with significant accuracy even under loads by external force using the hybrid measurement method, which utilizes both Brillouin frequency shifts and Rayleigh frequency shifts.

Embodiment 2

While Embodiment 1 shows the case of the 2×2 system, in which the four optical fibers, i.e., the two sets of two optical fibers are installed (embedded) two layers having different radii with the two optical fibers in each layer being wound around a cable or pipe, or the like in a double helix (two different initial circumferential positions), employing such the installation configuration, it happens that values of $M_x$, $M_y$ cannot be calculated, as can be seen from Eqs (27) or (28), owing to occurrence of zero denominator if $\theta_\alpha$ and $\theta_\beta$ are set to be the same value, for example. Therefore, it is necessary to be careful for the installation not to be in such the configuration in the 2×2 system. In a 3×2 system, in which two sets of three optical fibers are installed in two layers having different radii with the three optical fibers in each layer being wound around a cable or pipe, or the like with a triple helix (three initial circumferential positions different from each other by, for example, 120 degrees), it does not happen that values of $M_x$, $M_y$ cannot be calculated. In the present embodiment, therefore, a method for three-dimensional position measurement such as of a cable using the 3×2 system is described focusing on differences from the 2×2 system.

In the present embodiment, six optical fibers are used as a 3×2 system. A specification for the optical fibers in the 3×2 system is shown in FIG. 9. It is found from the figure that the initial circumferential positions are only different from those in the 2×2 system, and installation angles and distances from the center, i.e., the number of optical-fiber installation layers is the same as with the 2×2 system. Accordingly, the optical fibers are relatively easy to be installed (embedded) in the cable or pipe. While a hybrid measurement is also used in this system, detailed explanation of the measurement is omitted because it is the same as with the 2×2 system.

Applicability of the 3×2 system to three-dimensional position measurement is described first. The number of equations for, i.e., the number of measurement quantities of the frequency shift changes measured by the hybrid measurement using the six optical fibers increases to twelve in total compared to eight in the foregoing 2×2 system because the number of relational expressions for strain changes $\Delta\epsilon_5$ and $\Delta\epsilon_6$ of the fifth and sixth optical fibers increments by two per layer (see Eq. (9) and the specific relational expressions of $\Delta\epsilon_5$ and $\Delta\epsilon_6$ are omitted). Because there are total eight unknown quantities $\Delta P$, $\Delta T$, $\Delta\epsilon_1$, $\Delta\epsilon_2$, $\Delta\epsilon_3$, $\Delta\epsilon_4$, $\Delta\epsilon_5$, $\Delta\epsilon_6$ in this case, a pressure and a temperature applied to, and strains produced in each optical fibers can be calculated separately from frequency shift changes measured by the hybrid measurement and by solving the twelve simultaneous equations using the least squares method, as with the foregoing 2×2 system.

Derivation of relationships between the basic loads and strains ($\epsilon_{fi}, \dots$) obtained from $\Delta\epsilon_i$ (i=1, ..., 6) to be measured with the six optical fibers a1, a2, a3, b1, b2, b3 shown in FIG. 9 leads to the following Eqs. (45) to (50), respectively:

$$\varepsilon_{f1} = A_\alpha F + B_\alpha \sin\theta_\alpha M_x + B_\alpha \cos\theta_\alpha M_y + C_\alpha M_z, \tag{45}$$

$$\varepsilon_{f2} = A_\alpha F + B_\alpha \sin\left(\theta_\alpha + \frac{2\pi}{3}\right) M_x + B_\alpha \cos\left(\theta_\alpha + \frac{2\pi}{3}\right) M_y + C_\alpha M_z, \tag{46}$$

$$\varepsilon_{f3} = A_\alpha F + B_\alpha \sin\left(\theta_\alpha + \frac{4\pi}{3}\right) M_x + B_\alpha \cos\left(\theta_\alpha + \frac{4\pi}{3}\right) M_y + C_\alpha M_z, \tag{47}$$

$$\varepsilon_{f4} = A_\beta F + B_\beta \sin\theta_\beta M_x + B_\beta \cos\theta_\beta M_y + C_\beta M_z, \tag{48}$$

$$\varepsilon_{f5} = A_\beta F + B_\beta \sin\left(\theta_\beta + \frac{2\pi}{3}\right) M_x + B_\beta \cos\left(\theta_\beta + \frac{2\pi}{3}\right) M_y + C_\beta M_z, \tag{49}$$

and $$\varepsilon_{f6} = A_\beta F + B_\beta \sin\left(\theta_\beta + \frac{4\pi}{3}\right) M_x + B_\beta \cos\left(\theta_\beta + \frac{4\pi}{3}\right) M_y + C_\beta M_z. \tag{50}$$

Since the coefficients $A_\alpha$, $A_\beta$, $B_\alpha$, $B_\beta$, $C_\alpha$, $C_\beta$ in the above equations are the same as with the 2×2 system, expressions of them are omitted here. By measuring six strain values by the hybrid measurement and by solving the above equations, the basic loads F, $M_x$, $M_y$, $M_z$ are obtained as below.

First, the axial force and the torsional moment can be calculated by adding respective strains of the first-layer optical fibers and the second-layer optical fibers as shown in the following Eqs. (51) and (52), respectively:

$$F = \frac{C_\beta(\varepsilon_{f1} + \varepsilon_{f2} + \varepsilon_{f3}) - C_\alpha(\varepsilon_{f4} + \varepsilon_{f5} + \varepsilon_{f6})}{3(A_\alpha C_\beta - A_\beta C_\alpha)} \tag{51}$$

and $$M_z = \frac{-A_\beta(\varepsilon_{f1} + \varepsilon_{f2} + \varepsilon_{f3}) + A_\alpha(\varepsilon_{f4} + \varepsilon_{f5} + \varepsilon_{f6})}{3(A_\alpha C_\beta - A_\beta C_\alpha)}. \tag{52}$$

Next, the bending moment can be calculated by solving the following Eq. (53) using the least squares method:

$$\begin{pmatrix} \sin\theta_\alpha & -\sin\left(\theta_\alpha + \frac{2\pi}{3}\right) & \cos\theta_\alpha & -\cos\left(\theta_\alpha + \frac{2\pi}{3}\right) \\ \sin\theta_\alpha & -\sin\left(\theta_\alpha + \frac{4\pi}{3}\right) & \cos\theta_\alpha & -\cos\left(\theta_\alpha + \frac{4\pi}{3}\right) \\ \sin\theta_\beta & -\sin\left(\theta_\beta + \frac{2\pi}{3}\right) & \cos\theta_\beta & -\cos\left(\theta_\beta + \frac{2\pi}{3}\right) \\ \sin\theta_\beta & -\sin\left(\theta_\beta + \frac{4\pi}{3}\right) & \cos\theta_\beta & -\cos\left(\theta_\beta + \frac{4\pi}{3}\right) \end{pmatrix} \begin{pmatrix} M_x \\ M_y \end{pmatrix} = \tag{53}$$

$$\begin{pmatrix} \frac{\varepsilon_{f1} - \varepsilon_{f2}}{B_\alpha} \\ \frac{\varepsilon_{f1} - \varepsilon_{f3}}{B_\alpha} \\ \frac{\varepsilon_{f4} - \varepsilon_{f5}}{B_\beta} \\ \frac{\varepsilon_{f4} - \varepsilon_{f6}}{B_\beta} \end{pmatrix},$$

where the axial force and the torsional moment are eliminated. Since more optical fibers are used in Embodiment 2 than in Embodiment 1, measurement error can be more reduced than Embodiment 1 accordingly, thus bringing about an effect of improvement in accuracy of the three-dimensional position measurement.

Figure 10:
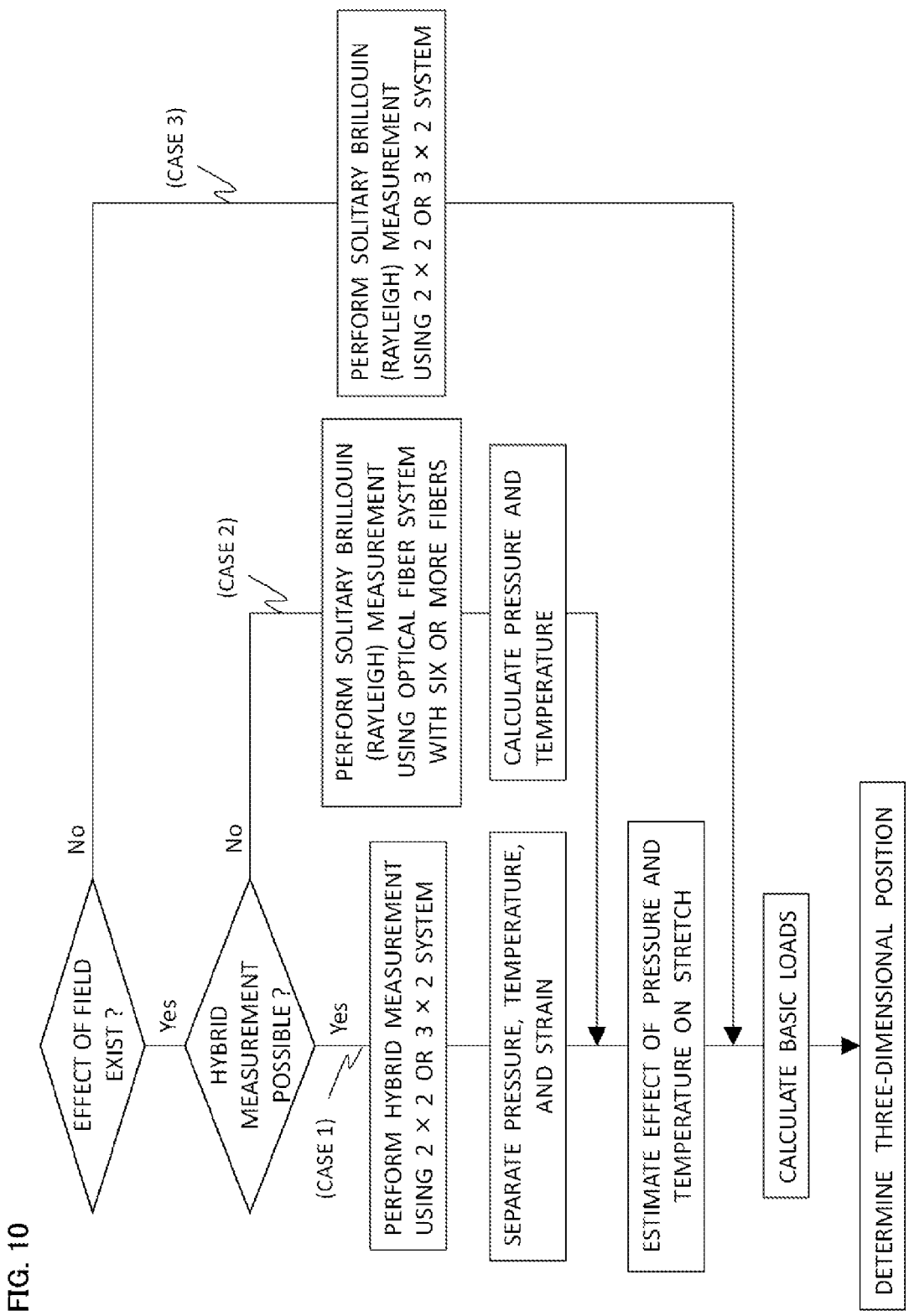
FIG. 10 is a flow diagram of measuring a three-dimensional position, according to Embodiments 1 to 3 of the present invention.

The consolidated process flow of the measurements described in Embodiments 1 and 2 is shown by Case 1 in FIG. 10. As shown in the figure, when a target to be measured is affected by the field such as of pressure, temperature and the hybrid measurement is applicable to the target, the hybrid measurement method using the 2×2 system described in Embodiment 1 or the 3×2 system described in Embodiment 2 is effective for determining a three-dimensional position of a cable or pipe with high accuracy (see Case 1 in FIG. 10).

In addition, there is a 1×3 system other than the above, in which three sets of an optical fiber are installed in three layers having different radii with the optical fiber in each layer being wound around a cable, pipe, or the like in a single helix (one installation angle only). In this case, the system exhibits a merit of reducing the number of optical fibers to be used, however, other problem, such as of taking time in installing, i.e., embedding of the optical fibers in the cable or the like, arise in implementation of the system, in addition to the care described in the explanation of the 2×2 system. Hence, the detailed explanation is omitted in the present patent application.

Embodiment 3

Cases to which the hybrid measurement is applicable have been described in Embodiments 1 and 2. In Embodiment 3, description is made of a three-dimensional measurement of a cable position without using the hybrid measurement. The three-dimensional position measurement of a cable can be performed accurately without using the hybrid measurement by a method described below. It should be noted that in a case according to the present embodiment, a three-dimensional position of the cable can be measured by a solitary measurement using any one of Brillouin frequency shifts and Rayleigh frequency shifts although embedding work of optical fibers in a cable or the like becomes burdensome and takes time compared to cases using the hybrid measurement. The following describes that such measurement is possible.

First, a discussion is made of a case of measuring a three-dimensional position at an arbitrary position of a cable or the like under effects of pressure and temperature by employing the present embodiment. In the measurement according to the present embodiment, although embedding work of optical fibers in a cable or pipe, which is a measurement target, takes time and effort to some degrees (because the optical fibers are embedded in four or more different layers), the three-dimensional position of the cable or the like can be measured with six or more optical fibers by a solitary measurement using any one of Brillouin frequency shifts and Rayleigh frequency shifts (see Case 2 in FIG. 10).

Figure 11:
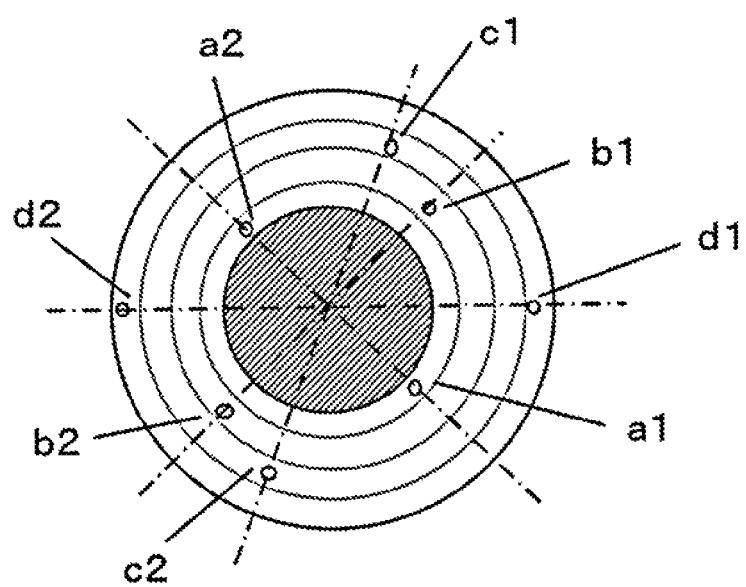
FIG. 11 is a cross-sectional view of installation of eight optical fibers according to Embodiment 3 of the present invention.

An installation configuration of the optical fibers for such a case is specifically described below. The installation configuration is roughly classified into three: Case a (1×6 system), Case b (2×4 or 2×2+2 system), and Case c (3×4 or 3×2+2 system). Case a is such that six optical fibers each are embedded separately in six layers having different installation radii, of a cable or the like in an independent helical configuration. While less optical fibers are needed for use than Case b and Case c, embedding of the optical fibers takes time and effort and the data processing is complicated. Case b is such that in the 2×4 system for example, eight optical fibers are installed (embedded) in four layers having different installation radii in a double helical configuration (see FIG. 11). In the 2×2+2 system, optical fibers are embedded in total four layers having different radii: two layers+one layer+one layer. In these systems, data processing and also embedding of the optical fibers are relatively easier than Case a. Case c corresponds to, for example, the 3×4 system, in which triple helices are installed (embedded) in four layers having different installation radii. In this case also, data processing and also embedding of the optical fibers are relatively easier than Case a. In addition, since three optical fibers are installed on the same radius, there is no possibility of installing them at a neutral plane (a so-called "dead point" does not appear).

In the following, description is made of Embodiment 3 taking the 2×4 system of Case b as a representative example. In this case, using the 2×4 system, i.e., using total eight optical fibers, strain changes of these eight optical fibers are determined from, for example, Brillouin frequency shifts $\Delta v_B$. Here, converting the Brillouin frequency shifts to apparent strain changes using $\Delta\epsilon_i = \Delta v_B / C_{11}$ for ease of data processing, the following Eq. (54) holds true for the strain changes of the eight optical fibers:

$$\begin{aligned} \Delta\varepsilon_1 &= A_\alpha \Delta P + B_\alpha \Delta T + C_\alpha \Delta F + D_\alpha \Delta M_x + E_\alpha \Delta M_y + F_\alpha \Delta M_z \\ \Delta\varepsilon_2 &= A_\alpha \Delta P + B_\alpha \Delta T + C_\alpha \Delta F + D_\alpha \Delta M_x + E_\alpha \Delta M_y + F_\alpha \Delta M_z \\ \Delta\varepsilon_3 &= A_\beta \Delta P + B_\beta \Delta T + C_\beta \Delta F + D_\beta \Delta M_x + E_\beta \Delta M_y + F_\beta \Delta M_z \\ \Delta\varepsilon_4 &= A_\beta \Delta P + B_\beta \Delta T + C_\beta \Delta F + D_\beta \Delta M_x + E_\beta \Delta M_y + F_\beta \Delta M_z \\ \Delta\varepsilon_5 &= A_\gamma \Delta P + B_\gamma \Delta T + C_\gamma \Delta F + D_\gamma \Delta M_x + E_\gamma \Delta M_y + F_\gamma \Delta M_z \\ \Delta\varepsilon_6 &= A_\gamma \Delta P + B_\gamma \Delta T + C_\gamma \Delta F + D_\gamma \Delta M_x + E_\gamma \Delta M_y + F_\gamma \Delta M_z \\ \Delta\varepsilon_7 &= A_\delta \Delta P + B_\delta \Delta T + C_\delta \Delta F + D_\delta \Delta M_x + E_\delta \Delta M_y + F_\delta \Delta M_z \\ \Delta\varepsilon_8 &= A_\delta \Delta P + B_\delta \Delta T + C_\delta \Delta F + D_\delta \Delta M_x + E_\delta \Delta M_y + F_\delta \Delta M_z \end{aligned} \tag{54}$$

where $A_\alpha$, $A_\beta$, $A_\gamma$, $A_\delta$, $B_\alpha$, $B_\beta$, $B_\gamma$, $B_\delta$, $C_\alpha$, $C_\beta$, $C_\gamma$, $C_\delta$, ... are coefficients correlating these strain changes with the basic loads and the like as with Embodiment 1. Eq. (54) shows that the bending moments can easily be separated from the other unknown quantities. Specifically, by solving, using a method such as a least squares method, the following simultaneous equations (55) obtained from the above equations, the bending moments can be calculated as solutions of Eq. (55).

$$\frac{1}{2}\begin{pmatrix} \Delta\varepsilon_1 - \Delta\varepsilon_2 \\ \Delta\varepsilon_3 - \Delta\varepsilon_4 \\ \Delta\varepsilon_5 - \Delta\varepsilon_6 \\ \Delta\varepsilon_7 - \Delta\varepsilon_8 \end{pmatrix} = \begin{pmatrix} D_\alpha & E_\alpha \\ D_\beta & E_\beta \\ D_\gamma & E_\gamma \\ D_\delta & E_\delta \end{pmatrix}\begin{pmatrix} \Delta M_x \\ \Delta M_y \end{pmatrix}. \quad (55)$$

The unknown quantities expect for the above can be obtained by solving the following four-unknown simultaneous equations (56):

$$\frac{1}{2}\begin{pmatrix} \Delta\varepsilon_1 + \Delta\varepsilon_2 \\ \Delta\varepsilon_3 + \Delta\varepsilon_4 \\ \Delta\varepsilon_5 + \Delta\varepsilon_6 \\ \Delta\varepsilon_7 + \Delta\varepsilon_8 \end{pmatrix} = \begin{pmatrix} A_\alpha & B_\alpha & C_\alpha & F_\alpha \\ A_\beta & B_\beta & C_\beta & F_\beta \\ A_\gamma & B_\gamma & C_\gamma & F_\gamma \\ A_\delta & B_\delta & C_\delta & F_\delta \end{pmatrix}\begin{pmatrix} \Delta P + \Delta\varepsilon_2 \\ \Delta T + \Delta\varepsilon_4 \\ \Delta F + \Delta\varepsilon_6 \\ \Delta M_z + \Delta\varepsilon_8 \end{pmatrix}. \quad (56)$$

It should be noted that in a case of no need to take into account the effects of pressure and temperature in a three-dimensional position measurement of a cable or pipe, a solitary measurement using Brillouin frequency shifts or Rayleigh frequency shifts can be performed by the 2×2 system or the 3×2 system as shown by the Case 3 in FIG. 10.

Figure 12:
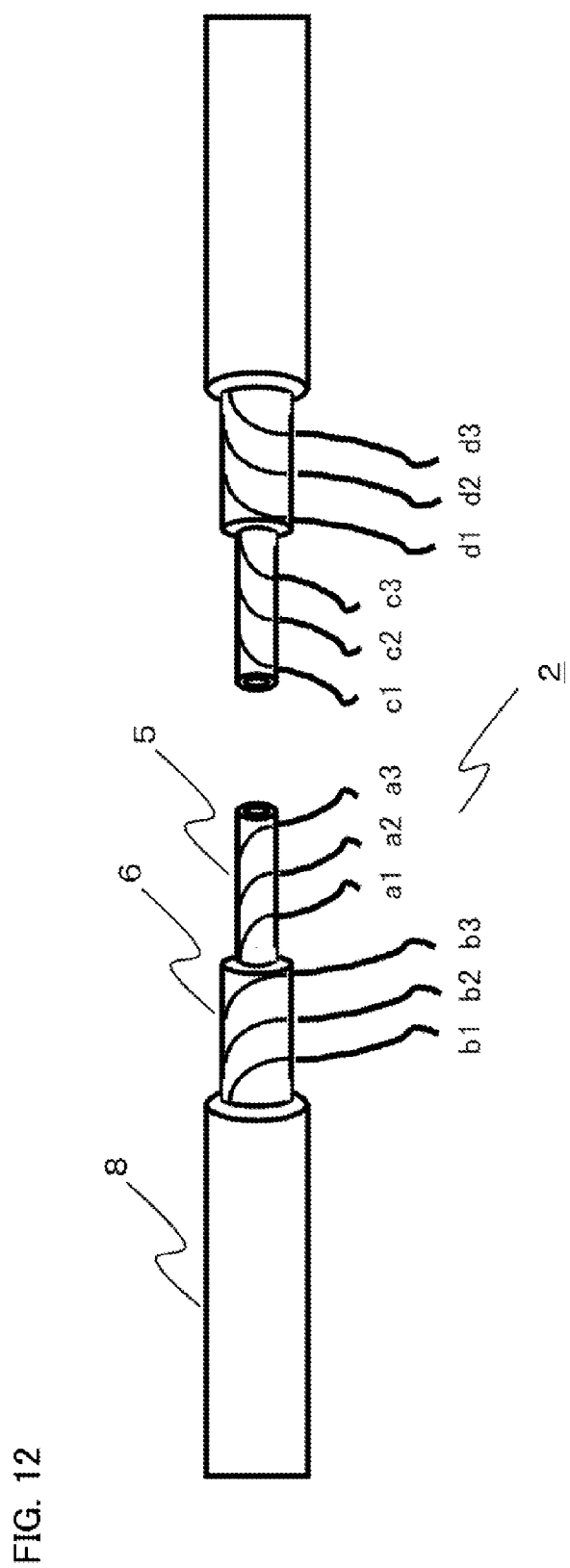
FIG. 12 is a view for explaining connectability of the optical fibers according to Embodiments 1 to 3 of the present invention.

Even in a case according to any of the embodiments, since the optical fibers are embedded in the outer circumferential layers of a cable or pipe, which is a measurement target, and each layers can be peeled off layer by layer from the surface (outermost layer), there is a feature that certain-length cables are easily connectable, thus coping with the measurement without any problems even if its measurement range is a long distance (for example, one kilometer or longer) (see FIG. 12).

Figure 13:
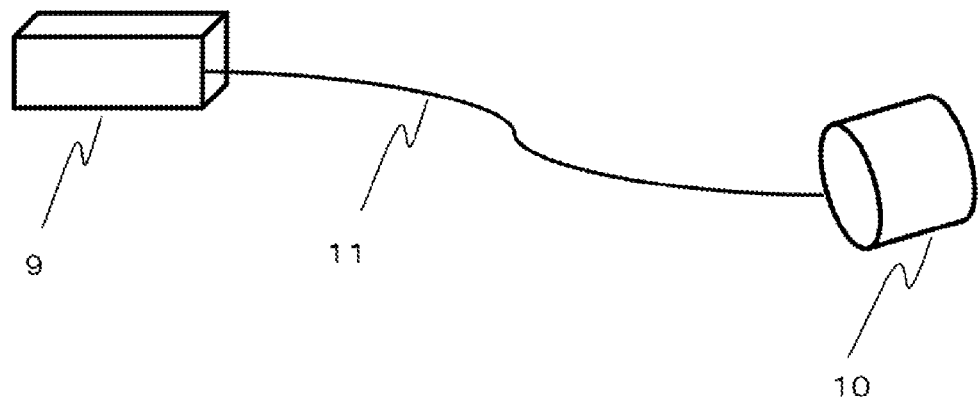
FIG. 13 is a diagram for explaining an on-line system according to Embodiments 1 to 3 of the present invention.

Additionally, even in any of the embodiments, the three-dimensional measurement method according to the present invention is applicable to so-called on-line system (see FIG. 13). In FIG. 13, a multi-channel optical fiber measurement and data processing system (including the hybrid backscattering measuring module and analyzer unit) 9 is connected to a fiber optic rotary joint 10 through an optical fiber cable (including use of one WDM-multi-channel fiber) 11. Here, WDM denotes wavelength division multiplexing. By using the on-line system, the three-dimensional position measurement according to the present invention can be performed even during operation of a coiled tubing (a steel pipe in a state of being taken up by a reel). Moreover, even in the forming stage of installing optical fibers in the cable or the like, application of the on-line system allows for acquiring initial data of the formed portion, bringing about the effect of enabling the data to be used as initial data for an actual measurement in a practical field.

Furthermore, since the optical fiber itself has a communication function, it is possible to establish communication to a device mounted on the head of an unmanned probe vehicle, a towed object, or the like connected to the end of the cable, i.e., reception/transmission of signals from/to the device and an electronic instrument such as a pressure sensor and a temperature sensor provided to the device.

REFERENCE NUMERALS

1: connecting body;
2, 2a1, 2a2, 2b1, 2b2, a1, a2, a3, c1, c2, c3, d1, d2, d3: optical fiber;
3: hybrid backscattering measuring module and analyzer unit;
4: inner structure;
5: inner tube;
6: first optical fiber installation layer;
7: second optical fiber installation layer;
8: outer protection layer;
9: multi-channel optical fiber measuring and data processing system;
10: fiber optic rotary joint; and
11: optical fiber cable.

The invention claimed is:

1. A three-dimensional position measurement system comprising:
   a connecting body including:
      an cylindrical inner tube;
      a tubular optical-fiber installation layer provided so as to cover an outer circumferential surface of the inner tube; and
      four or more optical fibers installed helically at predetermined pitches in the optical fiber installation layer so as to be deformed in accordance with deformation of the inner tube,
   a hybrid backscattering measuring module and analyzer unit including:
   a backscattering measuring module connected with the four or more optical fibers, the module emitting pulse laser light into the fibers and detecting Brillouin scattered light and Rayleigh scattered light in the optical fibers, to measure a frequency change of the Brillouin scattering and/or, a frequency change of Rayleigh scattering or a phase change of Rayleigh scattering for separately detecting strains and a pressure and a temperature from the frequency changes or the phase change; and
   an analyzer calculating respective strain changes due to bend, stretch, and torsion, and a pressure change and/or a temperature change produced in the inner tube from the frequency change of Brillouin scattering, and/or the frequency change of Rayleigh scattering or the phase change of Rayleigh scattering measured with the scattered light measuring module, and determining a three-dimensional position at a given point of the inner tube by analyzing the calculated respective strain changes and the pressure change and/or the temperature change.

2. The three-dimensional position measurement system of claim 1, wherein a plurality of the optical fiber installation layers are provided and sets of a plurality of the optical fibers are installed in the respective optical fiber installation layers at installation angles different from each other.

3. The three-dimensional position measurement system of claim 1, wherein in the three-dimensional position analysis, four components of strain changes due to deformation of the inner tube are analyzed and integrated for determination of a three-dimensional position at a given point of the inner tube.

4. The three-dimensional position measurement system of claim 1, wherein the scattered light measuring module uses both Brillouin scattering and Rayleigh scattering.

5. The three-dimensional position measurement system of claim 1, wherein the helical pitch for installing the optical fiber, which pitch is determined from installation angle of the optical fiber and distance between the center of the inner tube and the optical fiber, are given so that four or more detection points per pitch are ensured for detection of the Brillouin scattering and/or the Rayleigh scattering.

6. The three-dimensional position measurement system of claim 2, wherein the four or more optical fibers are installed in a double helix or a triple helix whose two or three initial circumferential positions are different from each other, respectively.

7. The three-dimensional position measurement system of claim 1, wherein the analyzer calculates a three-dimensional position at a given point s of the inner tube by an estimation using the following equation:

$$r(s)=r(0)+\int_0^s e_z(u)du,$$

where s is an arc-length parameter of a curve when the inner tube is regarded as a smooth curve, $e_z$ is a unit vector in a direction of the curve in a local coordinate system, and r(s) is the curve in a three-dimensional space.

8. The three-dimensional position measurement system of claim 1, wherein an additional optical-fiber installation layer is further provided outside the inner tube for an optical fiber to be installed in the additional optical fiber installation layer at a predetermined installation angle and at predetermined helical pitches, for determination of a three-dimensional position of the inner tube by the analyzer.

9. The three-dimensional position measurement system of claim 1, wherein the optical fiber installation layers can be peeled off layer by layer from the surface.

10. The three-dimensional position measurement system of claim 1, wherein the analyzer further includes a function of calibrating a three-dimensional position of the inner tube using at least one position-calibration method among a position calibration method using pressure, a position calibration method using temperature, and a position calibration method using data at a particular point.

11. The three-dimensional position measurement system of claim 5, wherein the four or more optical fibers are installed in a double helix or a triple helix whose two or three initial circumferential positions are different from each other, respectively.

12. The three-dimensional position measurement system of claim 2, wherein the optical fiber installation layers can be peeled off layer by layer from the surface.

\* \* \* \* \*